US012488335B2

(12) United States Patent
Peterson

(10) Patent No.: US 12,488,335 B2
(45) Date of Patent: *Dec. 2, 2025

(54) SYSTEMS AND METHODS FOR ELECTRONIC CERTIFICATION OF E-COMMERCE SECURITY BADGES

(71) Applicant: Worldpay, LLC, Symmes Township, OH (US)

(72) Inventor: Brant Peterson, Denver, CO (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,614

(22) Filed: Apr. 11, 2024

(65) Prior Publication Data

US 2024/0257113 A1   Aug. 1, 2024

Related U.S. Application Data

(63) Continuation of application No. 18/327,284, filed on Jun. 1, 2023, now Pat. No. 11,983,707, which is a continuation of application No. 17/652,322, filed on Feb. 24, 2022, now Pat. No. 11,704,664, which is a continuation of application No. 15/843,150, filed on Dec. 15, 2017, now Pat. No. 11,295,301.

(51) Int. Cl.
*G06Q 20/38* (2012.01)
*G06Q 20/12* (2012.01)
*G06Q 20/40* (2012.01)
*G06F 21/60* (2013.01)

(52) U.S. Cl.
CPC ........ *G06Q 20/3821* (2013.01); *G06Q 20/12* (2013.01); *G06Q 20/4014* (2013.01); *G06F 21/60* (2013.01)

(58) Field of Classification Search
None
See application file for complete search history.

(56) References Cited

U.S. PATENT DOCUMENTS 7,092,912 B2 * 8/2006 Khaishgi ............... G06Q 10/10
  705/58
8,646,072 B1 * 2/2014 Savant ................ H04L 63/1416
  726/22
8,813,181 B2   8/2014 Willis
  (Continued)

FOREIGN PATENT DOCUMENTS

WO   WO-2006018647 A1 *  2/2006   ......... H04L 63/1441
WO   WO-2015009247 A1 *  1/2015   ............. G06F 21/44

*Primary Examiner* — Paul S Schwarzenberg
(74) *Attorney, Agent, or Firm* — Bookoff McAndrews, PLLC

(57) ABSTRACT

A method for managing secure processing of electronic payment transactions includes receiving a request submitted by a merchant computing system for a security verifier. The security verifier is to be displayed on an electronic display associated with the merchant computing system. A set of security credentials received from a security service provider is measured against a security threshold. When the set of security credentials meets the security threshold, a uniform resource locator ("URL") is transmitted to the merchant computing system. The URL identifies the security verifier to be retrieved and displayed at the electronic display associated with the merchant computing system.

20 Claims, 6 Drawing Sheets

(56) References Cited

U.S. PATENT DOCUMENTS

| | | | |
|---|---|---|---|
| 9,691,089 B2 * | 6/2017 | Grass | G06Q 30/0609 |
| 9,712,532 B2 * | 7/2017 | Krall | H04L 29/12066 |
| 9,767,262 B1 * | 9/2017 | Canavor | H04L 9/3226 |
| 2008/0028443 A1 * | 1/2008 | Adelman | H04L 51/12 |
| | | | 726/4 |
| 2009/0077373 A1 * | 3/2009 | Kramer | H04L 63/1483 |
| | | | 713/155 |
| 2014/0337947 A1 | 11/2014 | Bretschneider et al. | |
| 2016/0261609 A1 * | 9/2016 | Derman | H04L 63/126 |

\* cited by examiner

SYSTEMS AND METHODS FOR ELECTRONIC CERTIFICATION OF E-COMMERCE SECURITY BADGES

CROSS-REFERENCE TO RELATED APPLICATION(S)

This patent application is a continuation of and claims the benefit of priority to U.S. application Ser. No. 18/327,284, filed on Jun. 1, 2023, which is a continuation of U.S. application Ser. No. 17/652,322, filed on Feb. 24, 2022, now U.S. Pat. No. 11,704,664, which is a continuation of U.S. application Ser. No. 15/843,150, filed on Dec. 15, 2017, now U.S. Pat. No. 11,295,301, the entireties of which are incorporated herein by reference.

TECHNICAL FIELD

The present disclosure relates generally to the field of electronic payment transactions and, more particularly, to electronic management of secure processing of payment transactions submitted over electronic networks.

BACKGROUND

Electronic transactions and networks are used for a great number of purchases and sales between e-commerce merchants and credit cardholders. A normal card transaction may involve a number of parties, including an account holder who possesses a card, an e-commerce merchant, an acquirer processor, an issuer processor, an issuer financial institution, and a card association network. Millions of such transactions occur over the Internet via electronic devices (e.g., computers, mobile devices, etc.), through which e-commerce merchants accept a variety of payment card types, such as credit cards, debit cards, prepaid cards, and so forth. Account holders entrust e-commerce merchants with keeping their credit card information secure when interacting with the electronic devices. However, the electronic devices may be vulnerable to security risks and may cause inconvenience and dissatisfaction for the merchant and the merchant's customers, possibly resulting in decreased revenue for the merchant.

The present disclosure is directed to overcoming one or more of these above-referenced challenges.

SUMMARY

According to certain aspects of the present disclosure, systems and methods are disclosed for managing secure processing of electronic payment transactions submitted over an electronic payments network.

In one embodiment, a computer-implemented method is disclosed for managing secure processing of electronic payment transactions. The method includes: receiving, at a server, a request submitted by a merchant computing system for a security verifier, wherein the security verifier is to be displayed on an electronic display associated with the merchant computing system; transmitting, by the server, a request to a security service provider for a set of security credentials; receiving, by the server, the set of security credentials from the security service provider; and determining, by the server, that the set of security credentials meets a security threshold, wherein if the set of credentials meets the security threshold, then transmitting a uniform resource locator ("URL") to the merchant computing system, wherein the URL identifies the security verifier to be retrieved and displayed at the electronic display associated with the merchant computing system.

In accordance with another embodiment, a system is disclosed for managing secure processing of electronic payment transactions. The system comprises: a memory having processor-readable instructions stored therein; and a processor configured to access the memory and execute the processor-readable instructions, which when executed by the processor configures the processor to perform a plurality of functions, including functions to: receive, at a server, a request submitted by a merchant computing system for a security verifier, wherein the security verifier is to be displayed on an electronic display associated with the merchant computing system; transmit, by the server, a request to a security service provider for a set of security credentials; receive, by the server, the set of security credentials from the security service provider; and determine, by the server, that the set of credentials meets a security threshold, wherein if the set of security credentials meets the security threshold, then transmit a uniform resource locator ("URL") to the merchant computing system, wherein the URL identifies the security verifier to be retrieved and displayed at the electronic display associated with the merchant computing system.

In accordance with another embodiment, a non-transitory machine-readable medium is disclosed that stores instructions that, when executed by a computer, cause the computer to perform a method for managing secure processing of electronic payment transactions. The method includes: receiving, at a server, a request submitted by a merchant computing system for a security verifier, wherein the security verifier is to be displayed on an electronic display associated with the merchant computing system; transmitting, by the server, a request to a security service provider for a set of security credentials; receiving, by the server, the set of security credentials from the security service provider; and determining, by the server, that the set of security credentials meets a security threshold, wherein if the set of security credentials meets the security threshold, then transmitting a uniform resource locator ("URL") to the merchant computing system, wherein the URL identifies the security verifier to be retrieved and displayed at the electronic display associated with the merchant computing system.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

DETAILED DESCRIPTION

Figure 1A:
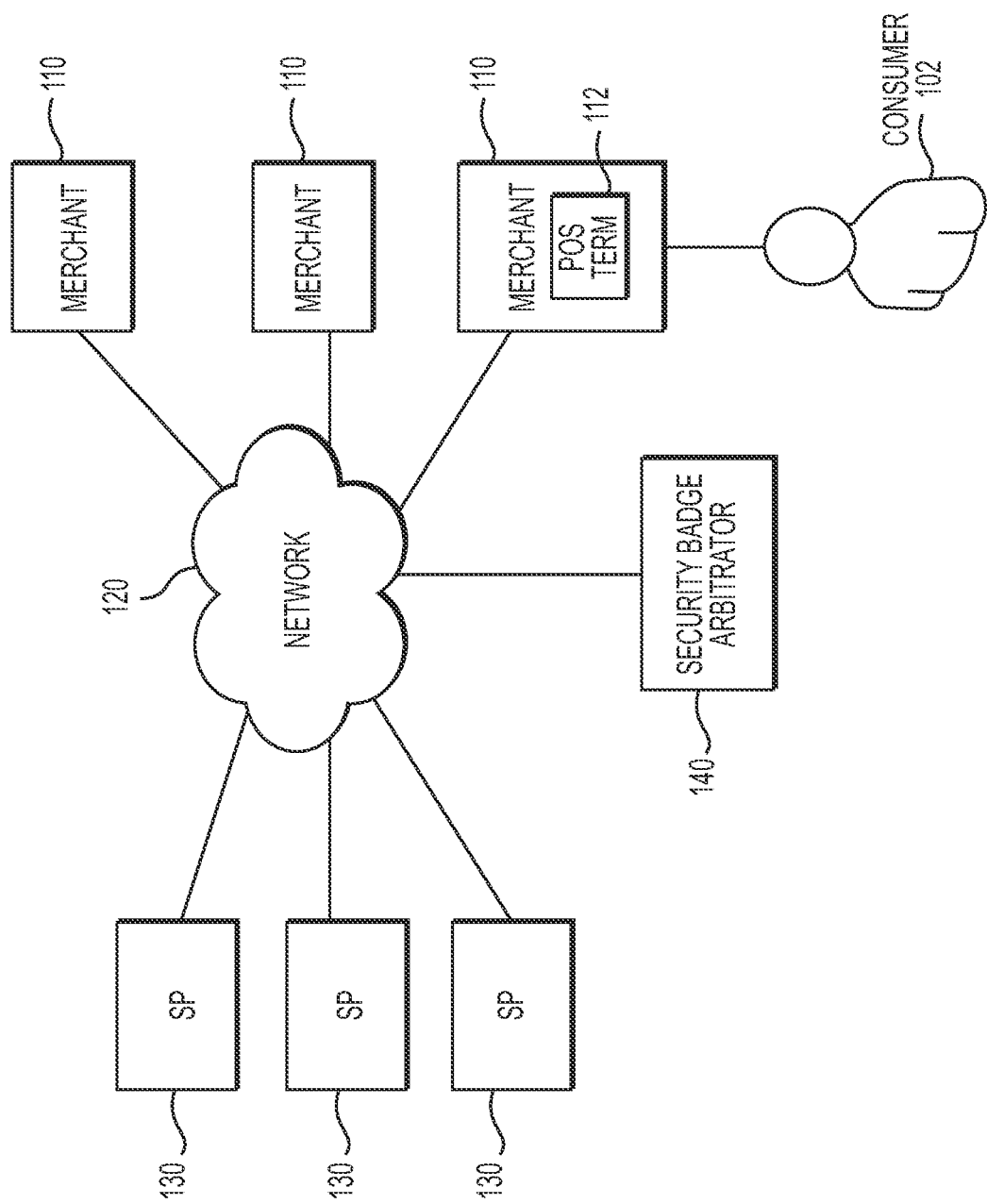
FIG. 1A depicts an example e-commerce merchant and an associated network of security service providers, according to one or more embodiments.

Various non-limiting embodiments of the present disclosure will now be described to provide an overall understanding of the principles of the structure, function, and use of systems, apparatuses, devices, and methods disclosed herein related to secure processing of electronic payment transactions. One or more examples of these non-limiting embodiments are illustrated in the selected examples disclosed and described in detail with reference made to FIGS. 1A-5 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc., are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated by those of ordinary skill in the art that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack.

For simplicity, the description that follows will be provided by reference to a "payment vehicle," which generally refers to any type of financial alternative to currency. As is to be clear to those skilled in the art, no aspect of the present disclosure is limited to a specific type of payment vehicle. Therefore, it is intended that the following description encompasses the use of the present disclosed techniques with many other forms of financial alternatives to currency, including credit cards, debit cards, smart cards, single-use cards, pre-paid cards, electronic currency (such as might be provided through a cellular telephone or personal digital assistant), and the like. Payment vehicles may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle may also have electronic functionality provided by a network of electronic circuitry that is printed or otherwise incorporated onto or within the payment vehicle (and typically referred to as a "smart card"), or be a fob having a transponder and an RFID reader, or may operate as a mobile wallet or by near field communication (NFC).

As described above, consumers are increasingly using computers and/or mobile devices to purchase goods or services over the Internet. E-commerce merchants generally provide online interfaces through which consumers may interact for making such purchases. E-commerce merchants generally accept payments from consumers through the online interfaces in the form of credit cards, prepaid cards, debit cards, and so forth. However, the online interfaces may be vulnerable to security risks and may cause inconvenience and dissatisfaction for the merchant and the merchant's customers. Some merchants contract with security service providers and employ a trust badge, or a trust seal, on their e-commerce websites to assuage customers that their personal data is being collected securely. Some examples of the trust badges include visual padlocks and/or shield markers that are strategically placed by the website payment forms to encapsulate the payment fields from the rest of the website. But there are a number of security service providers that any one merchant may employ for ensuring that electronic payment transactions are secure on their e-commerce websites. Thus, the embodiments of the present disclosure are directed to improving the secure processing of electronic payment transactions over electronic networks. Furthermore, embodiments of the present disclosure provide for a security badge arbitrator for monitoring the implementation of security policies at the online interfaces of the e-commerce websites.

One or more examples of these non-limiting embodiments are illustrated in the selected examples disclosed and described in detail with reference to FIGS. 1A-5 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Turning to FIG. 1A, there is depicted a plurality of e-commerce merchants 110 and a plurality of security service providers 130 that communicate over an electronic network 120. A consumer 102 (e.g., a debit or credit card account holder) may interact with an e-commerce merchant 110 at an electronic display 112 to complete a purchase transaction. The electronic display 112 may be associated with a consumer's computer or a mobile device (e.g., mobile phone, tablet, laptop, etc.). A security service provider 130 may provide security services for e-commerce merchant 110 and deploy a unique security badge to display on electronic display 112. However, each service provider 130 may generally provide their own trust seal to display on the electronic displays 112 associated with the e-commerce websites. With a greater number of security service providers 130, there may be a greater number of identifying security badges that are potentially displayed on electronic displays 112. With the greater number of disparate security badges that may be displayed on any one electronic display 112, trust may not be well engendered in consumers 102 that their cardholder data is being securely collected.

To better engender the trust of consumers 102, a security badge arbitrator 140 may serve as an agnostic system that monitors the security policies of each of the security service providers 130. Once the security badge arbitrator 140 determines that any one of security service provider 130 meets an established global standard, the security badge arbitrator 140 may then provide an interoperable global seal that merchants 110 may display on electronic displays 112 of e-commerce websites. The interoperable global seal provided by security badge arbitrator 140 (e.g., an independent and agnostic system) may serve as a certified attestation for consumers 102 that their consumer data is securely being collected according to an established global standard. It is to be appreciated that while security badge arbitrator 140 is shown as a separate entity, security badge arbitrator may be part of a hosted network 120.

Figure 1B:
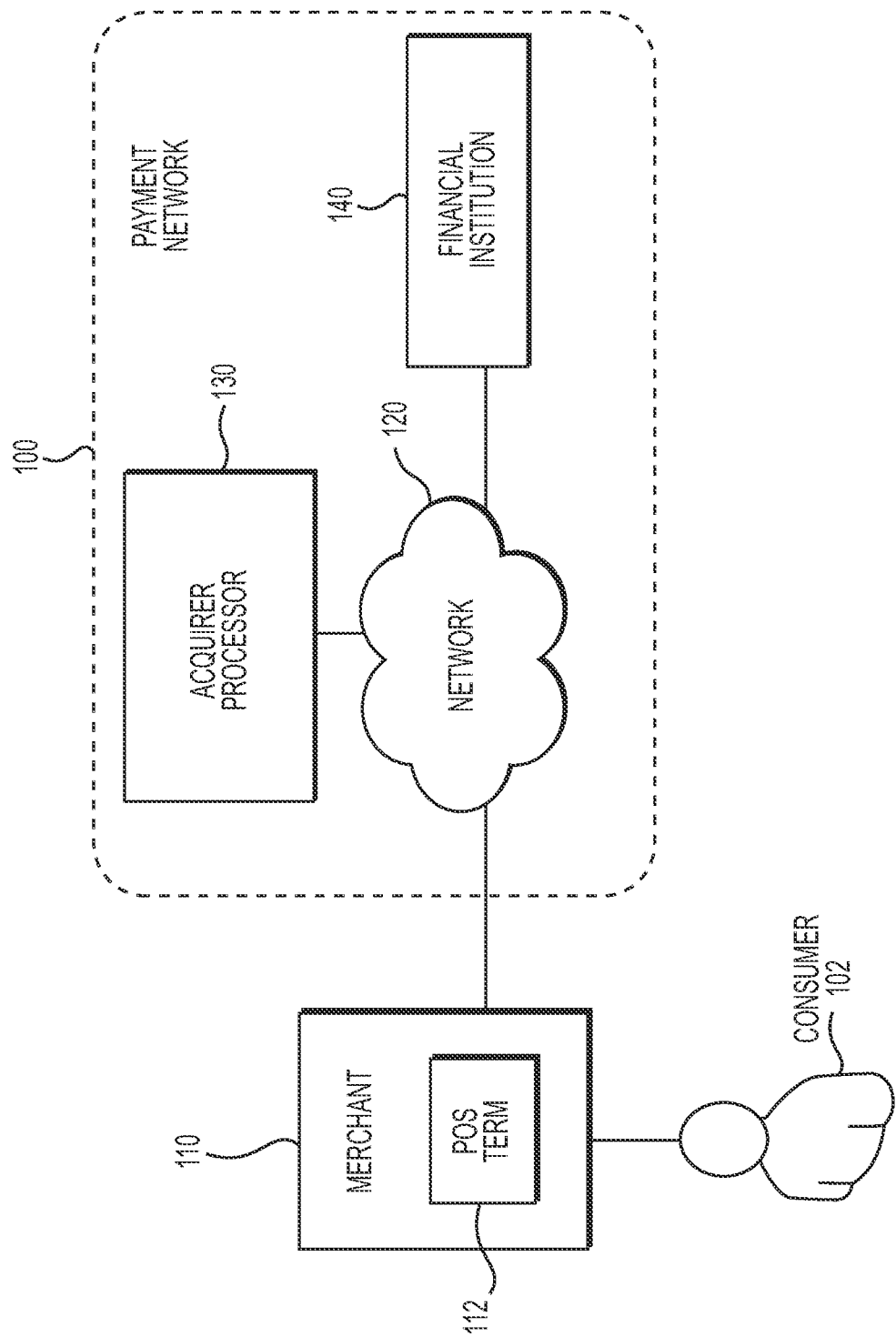
FIG. 1B depicts an example e-commerce merchant and an associated payment processing network, according to one or more embodiments.

FIG. 1B depicts a block diagram of an example payment environment 100 for performing electronic requests of payment transactions over an electronic network. A consumer 102, during the checkout process at a merchant's e-commerce store, pays for goods or services from a merchant 110 at an electronic display 112 of an e-commerce website. If the consumer 102 pays by credit card, the transaction is processed through a payment network 100. Because e-commerce merchant 110 generally uses a different bank or financial institution 140 than the consumer 102, an acquirer processor 130 handles the financial transactions necessary to transfer payment between the financial institutions 140 of the consumer 102 and e-commerce merchant 110. For simplicity, a "payment card" or "payment vehicle" generally refers to any type of financial alternative to currency, such as credit cards, debit cards, smart cards, single-use cards, pre-paid cards, and the like. E-commerce merchant 110 sends a payment request across a network 120 to the acquirer processor 130. The acquirer processor 130 requests an electronic transfer of funds from the financial institution 140 associated with the payment vehicle of the consumer 102, and settles the received funds to the financial institution 140 associated with e-commerce merchant 110.

During a purchase event, e-commerce merchant 110 may send an authorization for the purchase transaction to acquirer processor 130 that processes payment vehicle transactions for e-commerce merchant 110. Additional intermediary entities, such as one or more payment gateways, may assist with the handling and routing of authorization requests and/or other related messaging. For the purposes of illustration, such intermediary entities may be considered part of acquirer processor 100. An authorization request may include identifying information from the consumer's payment vehicle, such as a BIN number, an expiration date, and a first and last name of the account holder, for example. The authorization request may further include identifying information from the purchase, such as an amount and identifying information from consumer 102 and/or e-commerce merchant 110, for example.

Figure 2:
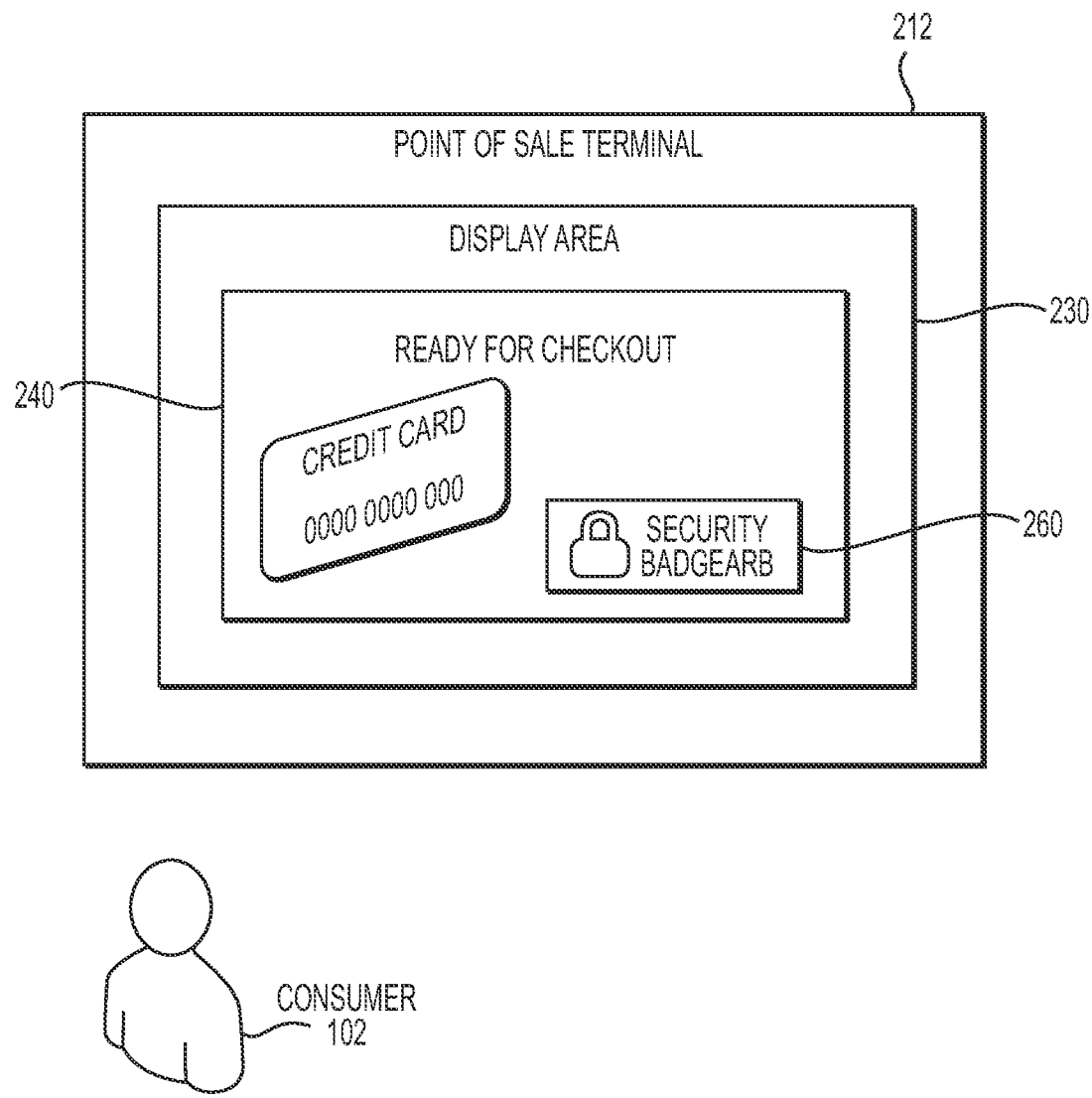
FIG. 2 depicts a block diagram of an example display element for a security badge on an electronic display associated with an e-commerce merchant, according to one or more embodiments.

Turning to FIG. 2, there is depicted an exemplary display of an electronic display 212 at an ecommerce checkout point 240 for consumer 102. As discussed above with reference to FIG. 1A, security badge arbitrator 140 may provide an interoperable global seal 260 that may be displayed on a display area 230 of electronic display 212. The interoperable global seal 260 (e.g., trust badge icon, symbol, seal, etc.) serves for consumer 102 as a certified attestation that the security services employed by e-commerce merchant 110 meets an established global security standard for e-commerce transactions.

Figure 3:
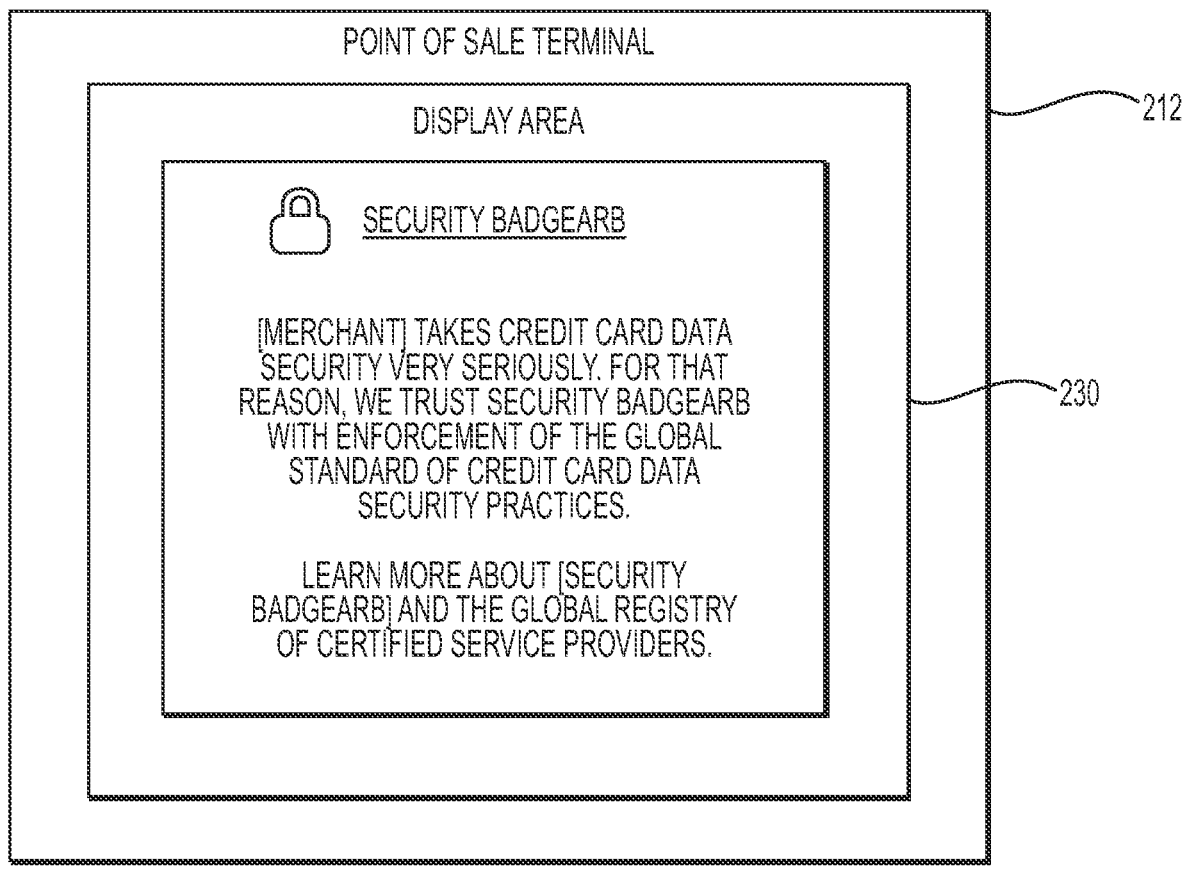
FIG. 3 depicts a block diagram of an example display element for a security badge on an electronic display associated with an e-commerce merchant, according to one or more embodiments.
Figure 3:
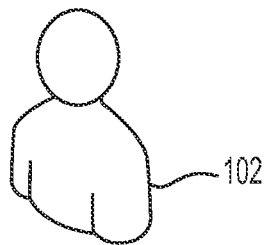

During the checkout point 240, consumer 102 may interact (e.g., click, swipe, touch, etc.) with the interoperable global seal 260 to obtain additional information regarding the global security standard. In FIG. 3, for example, there is depicted an example display of security information that may be available for consumer 102. By interacting with the interoperable global seal 260, consumer 102 may be provided assurance that the security policy employed by e-commerce merchant 110 meets an established global standard. In other embodiments, interacting with the interoperable global seal 260 may provide consumer 102 with a global registry of certified service providers.

Figure 4:
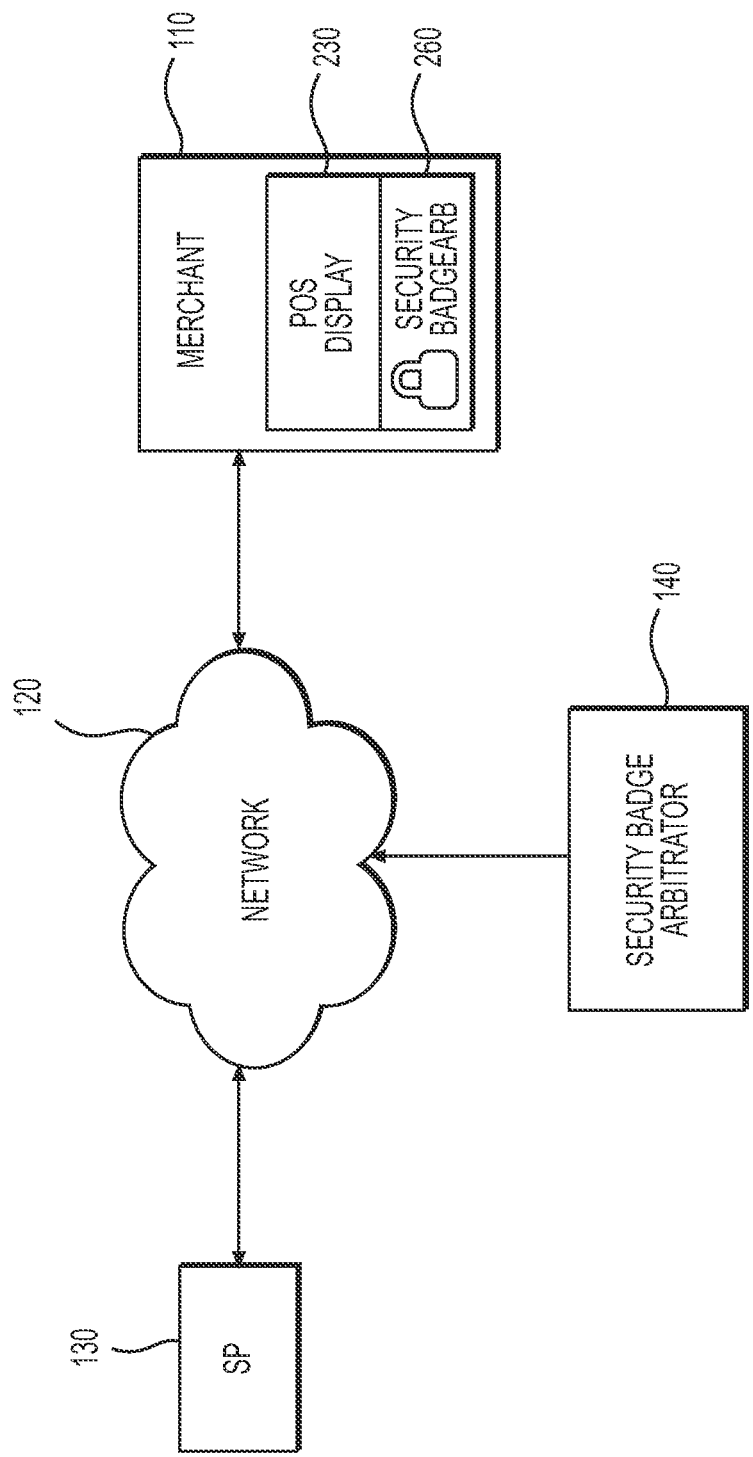
FIG. 4 depicts a block diagram of an example communication flow between e-commerce merchants and security service providers, according to one or more embodiments.

Turning now to FIG. 4, there is depicted a communication flow diagram for generating an interoperable global seal 260 to be displayed on an electronic display 230 of an e-commerce website associated with e-commerce merchant 110. In some embodiments, e-commerce merchant 110 may request security services for their e-commerce website from a security service provider 130. E-commerce merchant 110 may, for example, enter into a security services contract with security service provider 130. To engender trust in consumer 102 that their credit card information is securely protected when conducting purchase transactions, e-commerce merchant 110 may wish to display the interoperable global seal 260 on electronic display 230 of the e-commerce website.

To generate the interoperable global seal 260 for display on electronic display 230, security badge arbitrator 140 may request a set of security credentials from security service provider 130. In some embodiments, the set of security credentials may include data security standards, such as, e.g., EMVco, W3C, OWASP, etc. The set of security credentials may be provided to security badge arbitrator 140 via a defined web interface and/or a web service Application Program Interface ("API"). An API is generally a set of routines, protocols, and tools for building software applications. The API may also specify how software components should interact. Once security badge arbitrator 140 receives the set of security credentials from security service provider 130, security badge arbitrator 140 may determine whether the set of security credentials meets the established global security standards. Once the security badge arbitrator 140 determines that security service provider 130 meets the established global security standards, security badge arbitrator 140 may generate a uniform resource locator ("URL") for e-commerce merchant 110. The URL is provided to e-commerce merchant 110 and generates the interoperable global seal 260 to be retrieved and displayed on electronic display 230 (e.g., e-commerce merchant 110 loads onto the e-commerce checkout page). In some embodiments, security badge arbitrator 140 may host the URL and a global certified number that is unique to security service provider 130. The hosted URL may embody the interoperable global seal (e.g., security badge) and other information, including links to a certification list of security service providers. The hosted URL may be unique to each security service provider's certification. In some embodiments, the global certified number may be unique per each certification listing. In other embodiments, security service provider 130 may have more than one certification listing and/or URL.

Once the interoperable global seal 260 is generated to be retrieved and displayed on electronic display 230, security badge arbitrator 140 may monitor the security service providers 130 to ensure that the set of security credentials continues to meet the established global security standards. In some embodiments, the monitoring and enforcement may occur dynamically and in real-time. In other embodiments, the monitoring and enforcement may occur at periodic intervals (e.g., daily, weekly, monthly, or annual audits). The periodic monitoring and enforcement may require renewed certification and/or attestation that the set of security credentials continues to meet the established global security standards.

In case a security service provider 130 fails to meet the established global security standards, security badge arbitrator 140 may revoke access to the hosted URL and/or deny display of the interoperable global seal 260. In other embodiments, security badge arbitrator 140 may also issue an alert to security service provider 130 for remediation, and/or security service provider 140 may issue a notification to stakeholders that the interoperable global seal 260 has been denied for failure to align to the established global security standards. Once remediated, security service provider 130 may be granted renewed access to the hosted URL and for the interoperable global seal to be retrieved and displayed on electronic display 230. Conversely, security badge arbitrator 140 may determine that e-commerce merchant 110 is no longer employing the security policies provided by security service provider 130. Unless remediated, security badge arbitrator 140 may disable and/or revoke the hosted URL and thus deny retrieval and/or display of the interoperable global seal 260.

Figure 5:
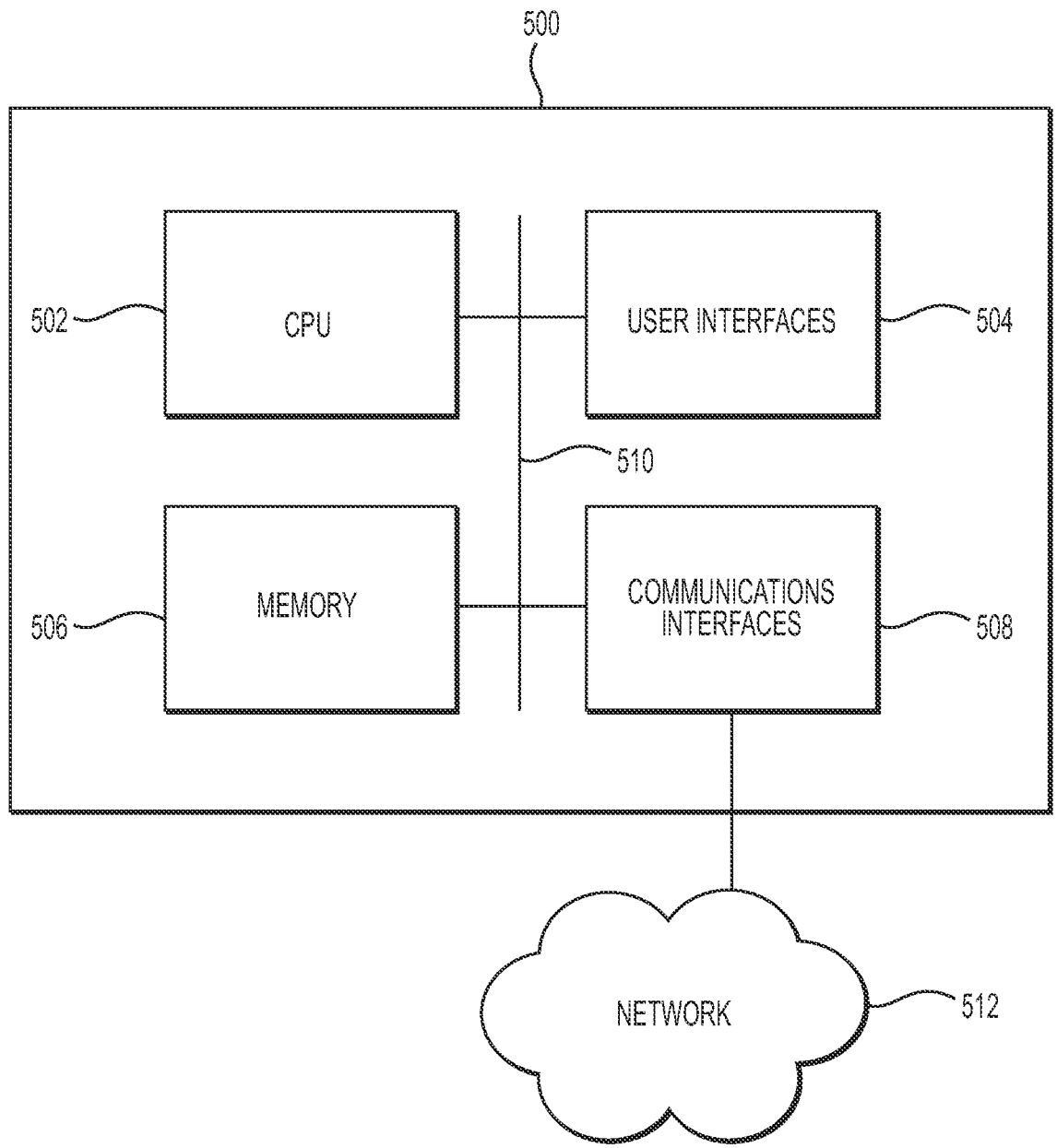
FIG. 5 depicts a block diagram of an example computing device, according to one or more embodiments.

The systems and processes described above can be performed on or between one or more computing devices 500. Referring now to FIG. 5, an example computing device 500 is presented. A computing device 500 can be a server, a computing device that is integrated with other systems or subsystems, a mobile computing device such as a smart phone, a cloud-based computing capability, and so forth. The computing device 500 can be any suitable computing device as would be understood in the art, including without limitation, a custom chip, an embedded processing device, a tablet computing device, an electronic display 212 associated with e-commerce merchant 210, a back office system of an e-commerce merchant 210, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 500 includes a processor 502 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 500 also includes one or more memories 506, for example read only memory (ROM), random access memory (RAM), cache memory associated with the processor 502, or other memories such as dynamic RAM (DRAM), static ram (SRAM), programmable ROM (PROM), electrically erasable PROM (EEPROM), flash memory, a removable memory card or disk, a solid state drive, and so forth. The computing device 500 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 502, or memories 506 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 508 can be configured to transmit to, or receive data from, other computing devices 500 across a network 512. The network and communication interfaces 508 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 508 can include wired data transmission links such as Ethernet and TCP/IP. The communication interfaces 508 can include wireless protocols for interfacing with private or public networks 512. For example, the network and communication interfaces 508 and protocols can include interfaces for communicating with private wireless networks such as a Wi-Fi network, one of the IEEE 802.11x family of networks, or another suitable wireless network. The network and communication interfaces 508 can include interfaces and protocols for communicating with public wireless networks 508, using for example wireless protocols used by cellular network providers, including Code Division Multiple Access (CDMA) and Global System for Mobile Communications (GSM). A computing device 400 can use network and communication interfaces 508 to communicate with hardware modules such as a database or data store, or one or more servers or other networked computing resources. Data can be encrypted or protected from unauthorized access.

In various configurations, the computing device 500 can include a system bus 510 for interconnecting the various components of the computing device 500, or the computing device 500 can be integrated into one or more chips such as programmable logic device or application specific integrated circuit (ASIC). The system bus 510 can include a memory controller, a local bus, or a peripheral bus for supporting input and output devices 504, and communication interfaces 508. Example input and output devices 504 include keyboards, keypads, gesture or graphical input devices, motion input devices, touchscreen interfaces, one or more displays, audio units, voice recognition units, vibratory devices, computer mice, and any other suitable user interface.

The processor 502 and memory 506 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A method for managing secure processing of electronic transactions, comprising:
   receiving, by a server, a request for a security verifier to be displayed on an electronic display of a third-party computing system;
   transmitting, by the server, a request for security credentials associated with the third-party computing system to one or more security service providers;
   receiving, by the server, a plurality of security credentials from a subset of security service providers among the one or more security service providers;
   determining, by the server, that at least one subset of security credentials among the plurality of security credentials meets a network security threshold;
   generating and transmitting a plurality of uniform resource locators ("URL") unique to each of the one or more security service providers associated with the at least one subset of security credentials;
   monitoring, by the server, whether the subset of security credentials continues to meet the network security threshold; and
   transmitting, by the server, a notification to the one or more security service providers based on the determination of whether the subset of security credentials meets the network security threshold.

2. The method of claim 1, wherein the server is a security badge arbitrator.

3. The method of claim 1, wherein the monitoring of the plurality of security credentials occurs dynamically and in real-time.

4. The method of claim 1, wherein the network security threshold includes global security standards established by at least one of EMVco, W3C, and OWASP.

5. The method of claim 1, wherein the one or more security service providers provide the subset of security credentials to the server via a web service application programming interface ("API").

6. The method of claim 1, further comprising:
   transmitting, by the server, a renewed request for the subset of security credentials from at least one security service provider among the subset of security service providers to measure against the network security threshold; and
   receiving, in response to the renewed request, the subset of security credentials from the at least one security service provider among the subset of security service providers,
   wherein the renewed request for the subset of security credentials from the at least one security service provider among the subset of security service providers to measure against the network security threshold is transmitted at periodic intervals.

7. The method of claim 1, further comprising:
   transmitting at periodic intervals, by the server, a validation request to the third-party computing system;
   receiving, in response to the validation request, from the third-party computing system, a security policy as installed on the third-party computing system;
   determining, by the server, whether the security policy matches a security solution provided by the one or more security service providers; and
   proceeding, by the server and based on the security policy not matching the security solution provided by the security service provider, to i) revoke access to the generated URL and ii) deny display of the security verifier on the electronic display of the third-party computing system.

8. A non-transitory computer readable medium storing a program causing a computer to execute a method for managing secure processing of electronic payment transactions, the method comprising:
   receiving, by a server, a request for a security verifier to be displayed on an electronic display of a third-party computing system;
   transmitting, by the server, a request for security credentials associated with the third-party computing system to one or more security service providers;
   receiving, by the server, a plurality of security credentials from a subset of security service providers among the one or more security service providers;
   determining, by the server, that at least one subset of security credentials among the plurality of security credentials meets a network security threshold;
   generating and transmitting a plurality of uniform resource locators ("URL") unique to each of the one or more security service providers associated with the at least one subset of security credentials;
   monitoring, by the server, whether the subset of security credentials continues to meet the network security threshold; and
   transmitting, by the server, a notification to the one or more security service providers based on the determination of whether the subset of security credentials meets the network security threshold.

9. The non-transitory computer readable medium of claim 8, wherein the server is a security badge arbitrator.

10. The non-transitory computer readable medium of claim 8, wherein the monitoring of the plurality of security credentials occurs dynamically and in real-time.

11. The non-transitory computer readable medium of claim 8, wherein the network security threshold includes global security standards established by at least one of EMVco, W3C, and OWASP.

12. The non-transitory computer readable medium of claim 8, wherein the one or more security service providers provide the subset of security credentials to the server via a web service application programming interface ("API").

13. The non-transitory computer readable medium of claim 8, the method further comprising:

transmitting, by the server, a renewed request for the subset of security credentials from at least one security service provider among the subset of security service providers to measure against the network security threshold; and receiving, in response to the renewed request, the subset of security credentials from the at least one security service provider among the subset of security service providers, wherein the renewed request for the subset of security credentials from the at least one security service provider among the subset of security service providers to measure against the network security threshold is transmitted at periodic intervals.

14. The non-transitory computer readable medium of claim 8, the method further comprising:

transmitting at periodic intervals, by the server, a validation request to the third-party computing system;

in response to the validation request, receiving from the third-party computing system, a security policy as installed on the third-party computing system;

determining, by the server, whether the security policy matches a security solution provided by the one or more security service providers; and based on the security policy not matching the security solution provided by the security service provider, proceeding, by the server, to i) revoke access to the generated URL and ii) deny display of the security verifier on the electronic display of the third-party computing system.

15. A computing system for managing secure processing of electronic payment transactions, the computing system comprising:

a memory having processor-readable instructions stored therein; and a processor configured to access the memory and execute the processor-readable instructions, which when executed by a processor cause the processor to perform a plurality of functions, including functions to:

receive, by a server, a request for a security verifier to be displayed on an electronic display of a third-party computing system;

transmit, by the server, a request for security credentials associated with the third-party computing system to one or more security service providers;

receive, by the server, a plurality of security credentials from a subset of security service providers among the one or more security service providers;

determine, by the server, that at least one subset of security credentials among the plurality of security credentials meets a network security threshold;

generate and transmitting a plurality of uniform resource locators ("URL") unique to each of the one or more security service providers associated with the at least one subset of security credentials;

monitor, by the server, whether the subset of security credentials continues to meet the network security threshold; and transmit, by the server, a notification to the one or more security service providers based on the determination of whether the subset of security credentials meets the network security threshold.

16. The system of claim 15, wherein the server is a security badge arbitrator.

17. The system of claim 15, wherein the monitoring of the plurality of security credentials occurs dynamically and in real-time.

18. The system of claim 15, wherein the network security threshold includes global security standards established by at least one of EMVco, W3C, and OWASP.

19. The system of claim 15, wherein the one or more security service providers provide the subset of security credentials to the server via a web service application programming interface ("API").

20. The system of claim 15, the functions further comprising:

transmitting, by the server, a renewed request for the subset of security credentials from at least one security service provider among the subset of security service providers to measure against the network security threshold; and receiving, in response to the renewed request, the subset of security credentials from the at least one security service provider among the subset of security service providers, wherein the renewed request for the subset of security credentials from the at least one security service provider among the subset of security service providers to measure against the network security threshold is transmitted at periodic intervals.

* * * * *